United States Patent
Keßler

(10) Patent No.: US 12,351,236 B2
(45) Date of Patent: Jul. 8, 2025

(54) METHOD FOR STEERING A VEHICLE

(71) Applicant: Continental Automotive Technologies GmbH, Hannover (DE)

(72) Inventor: Philipp Keßler, Nierstein (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 105 days.

(21) Appl. No.: 17/905,234

(22) PCT Filed: Feb. 23, 2021

(86) PCT No.: PCT/DE2021/200020
§ 371 (c)(1),
(2) Date: Aug. 29, 2022

(87) PCT Pub. No.: WO2021/175383
PCT Pub. Date: Sep. 10, 2021

(65) Prior Publication Data
US 2023/0139711 A1 May 4, 2023

(30) Foreign Application Priority Data
Mar. 4, 2020 (DE) ...................... 10 2020 202 757.9

(51) Int. Cl.
*B62D 15/02* (2006.01)
*B62D 5/04* (2006.01)

(52) U.S. Cl.
CPC ......... *B62D 15/025* (2013.01); *B62D 5/0463* (2013.01); *B62D 5/0481* (2013.01)

(58) Field of Classification Search
CPC ................ B62D 15/025; B62D 5/0463; B62D 5/0481; B62D 5/04; B62D 6/001; B62D 6/002; B62D 15/0255
See application file for complete search history.

(56) References Cited

U.S. PATENT DOCUMENTS

| | | | |
|---|---|---|---|
| 2017/0305458 A1 | 10/2017 | Wang et al. | |
| 2017/0372150 A1 | 12/2017 | Mayser | |

FOREIGN PATENT DOCUMENTS

| | | | | |
|---|---|---|---|---|
| CN | 105813914 A | 7/2016 | | |
| CN | 108674414 A | 10/2018 | | |
| DE | 102013019130 A1 | 6/2014 | | |
| DE | 102014223000 A1 * | 11/2014 | ............... | G08G 1/16 |
| DE | 102015209066 A1 | 11/2016 | | |
| DE | 102016221723 A1 | 5/2017 | | |

(Continued)

OTHER PUBLICATIONS

Notice of Reasons for Refusal drafted Feb. 8, 2024 for the counterpart Japanese Patent Application No. 2022-549545 and translation of same.

(Continued)

*Primary Examiner* — Brian P Sweeney

(57) ABSTRACT

A method for controlling a vehicle along a trajectory, in which the vehicle has a control device which plans the trajectory within a definable search space of the trajectory and can access actuators of the vehicle in order to control the vehicle, wherein at least one limit value is determined for at least one manipulated variable of an actuator, and a search space of the manipulated variable is defined on the basis of the at least one limit value, wherein the search space is used to plan the trajectory.

18 Claims, 3 Drawing Sheets

(56) References Cited

FOREIGN PATENT DOCUMENTS

| DE | 102017108692 A1 | 10/2017 | | |
|---|---|---|---|---|
| DE | 102018203617 A1 | * | 3/2018 | ............ B60W 40/12 |
| JP | 2007302040 A | | 11/2007 | |
| JP | 2011131838 A | | 7/2011 | |
| JP | 2018094966 A | | 6/2018 | |

OTHER PUBLICATIONS

German Search Report dated Dec. 11, 2020 for the counterpart German Patent Application No. 10 2020 202 757.9.
The International Search Report and the Written Opinion of the International Searching Authority mailed on Jun. 1, 2021 for the counterpart PCT Application No. PCT/DE2021/200020.
European Examination Report dated Jun. 16, 2023 for the counterpart European Patent Application No. 21 712 035.1 and DeepL translation of same.
Notice of Reasons of Refusal mailed Aug. 8, 2023 for the counterpart Japanese Patent Application No. 2022-549545 and DeepL translation of same.
First Search dated Mar. 24, 2025 from corresponding Chinese patent application No. 202180018437.6.
First Notice of Examination Opinion dated Mar. 24, 2025 from corresponding Chinese patent application No. 202180018437.6.

* cited by examiner

METHOD FOR STEERING A VEHICLE

CROSS-REFERENCE TO RELATED APPLICATIONS

The present application is a National Stage Application under 35 U.S.C. § 371 of International Patent Application No. PCT/DE2021/200020 filed on Feb. 23, 2021, and claims priority from German Patent Application No. 10 2020 202 757.9 filed on Mar. 4, 2020, in the German Patent and Trademark Office, the disclosures of which are herein incorporated by reference in their entireties.

TECHNICAL FIELD

The present invention relates to a method for controlling a vehicle along a trajectory and to a control device that is designed to control a vehicle along a trajectory.

BACKGROUND

Modern vehicles such as passenger cars, trucks, motorized two-wheelers or other means of transport known from the prior art are increasingly equipped with (driver) assistance systems which, with the aid of suitable sensors or sensor systems, can capture the environment, recognize traffic situations and assist the driver, e.g. by means of a braking or steering intervention or by outputting a visual or acoustic warning. Radar sensors, lidar sensors, camera sensors, ultrasonic sensors or the like are regularly used as sensor systems for capturing the environment. From the sensor data determined by the sensors, conclusions can then be drawn about the environment. Generic assistance functions can then be implemented on the basis of these conclusions, e.g. lane keeping control or a lane keeping assistant (LKA-Lane Keep Assist).

Furthermore, modern vehicles generally comprise electric steering or steering assistance (EPS=Electric Power Steering, EPAS=Electric Power Assisted Steering) or power steering which assists the driver by reducing the force to be applied by the driver in order to operate the steering wheel. For example, this can be carried out by virtue of an electric servomotor (EPS motor or Electric Power Steering motor) or servomotor being arranged on the mechanism of the steering system, e.g. on the steering column or steering gear, and by virtue of the steering movements of the driver being assisted or superimposed by an applied motor torque or servo torque. The electric servomotor and the associated control unit can be positioned in this case in the steering train (C-EPS or Column EPS), on the steering gear pinion (P-EPS or Pinion EPS) or parallel/concentrically around the rack (R-EPS or Rack EPS). In addition, provision is made of a sensor system which comprises an absolute steering wheel angle sensor, a steering torque sensor and a relative rotor position angle sensor of the motor and, if necessary, current sensors, from which a motor torque or servo torque can be estimated, for example.

In the field of assistance functions and autonomous driving, the vehicle is generally controlled via a cascade of planners (e.g. maneuver planners and trajectory planners) and controllers. In this case, the controller attempts to follow the trajectory generated by the planner. Depending on the planning approach, however, it can happen that the planner plans trajectories that cannot be navigated or can be navigated only poorly by the controller or the vehicle due to actuator limitations that are not known to the planner or cannot be processed by the latter. The actuators can thus reach their limit and a wind-up effect in the control can occur. This means that during a planning cycle the vehicle can deviate from the desired trajectory, which means that the newly planned trajectory has to change more to compensate for the deviation. This creates an internal dynamic between the planner and controller, which worsens the management behavior of the vehicle and can be noticed by the driver, e.g. as swinging in the lane. If a trajectory cannot be navigated, the driver must intervene. There are model-predictive approaches in planning and/or control which offer the advantage that the vehicle dynamics and the actuator limitations can be taken into account in the form of a model during planning. With this approach, the subordinate controllers can be dispensed with if the model accuracy is high. However, as the model complexity increases, such approaches require more computing effort, although the computing effort is already extremely high for simple models, with the result that a model that also takes actuator dynamics and limitations into account is not practicable.

DE 10 2016 221 723 A1 discloses a control system for a vehicle with a plurality of actuators (e.g. Steering system, drive train, service brake and parking brake). The control system in this case comprises a module for controlling the movement of the vehicle, a module for controlling the actuators, a module for specifying a vehicle operating strategy to be implemented, and a module for coordinating torques, wherein the movement requirements imposed on the vehicle are used to form a normalized requirement vector resulting therefrom and having a longitudinal component, a lateral component and a vertical component. Furthermore, the control system is configured to form torques, which are distributed among the actuators, on the basis of the vehicle operating strategy and the requirement vector.

DE 10 2015 209 066 A1 describes a method for cost-reduced trajectory planning for a vehicle, in which the search space for determining the trajectory is limited on the basis of an approximated end time. The search space for determining the trajectory for the driving maneuver is limited in this case to a specific area around the approximated end time, in particular by 10% around the approximated end time, in order to reduce the computing effort needed to determine the trajectory.

Therefore, providing a generic method for controlling a vehicle, in which the trajectory planning is improved in a simple and cost-effective manner in not yet known in the art.

SUMMARY

A method for controlling a vehicle along a trajectory comprises planning a trajectory with a control device within a definable search space (search space of the trajectory or for trajectory planning). The control device can access actuators of the vehicle in order to control the vehicle. At least one limit value is determined for at least one manipulated variable of an actuator. The search space of the manipulated variable is defined on the basis of the limit value or limit values. The search space of the manipulated variable is then used to plan the trajectory. The search space of the manipulated variable in this case may consistute a subspace of the search space of the trajectory, which means that limiting the search space of the manipulated variable also limits the search space of the trajectory. Thus, it is possible to calculate a trajectory in relation to the actuator dynamics. In addition, this can save a great deal of computing time, for example compared to a method in which the actuator dynamics are integrated into an MPC (model predictive control) model. Due to the fact that it is separated from the planner, the method can also be used for different planner approaches, whereby software limitations for the motor torque and the steering speed as well as degradations of the steering system can also be easily taken into account. The operational reliability is thereby increased even further. Furthermore, the method described can also be used for a plurality of actuators and independently of a complex vehicle model.

The steering system of the vehicle or an EPS motor of an electric steering system may be provided as the actuator.

The steering angle and/or the steering angle speed and/or the curvature of the road and/or the motor torque of the EPS motor may be provided as the manipulated variable.

A maximum time progression of the manipulated variable to the left and the maximum time progression of the manipulated variable to the right may be provided as the limit value and may then synchronized with the planner. This may be the maximum steering angle to the left and the maximum steering angle to the right, if the steering angle is provided as the manipulated variable or as one of the manipulated variables. Alternatively or additionally, the maximum navigable curvature (of the road) to the left and the maximum navigable curvature (of the road) to the right may also be provided as the limit value.

According to a further configuration, the difference between the force currently applied to the EPS motor and the maximum available force can be determined, for example by virtue of the fact that the power of the EPS or of the EPS motor is set at the beginning or is made available to the prediction by the EPS as an input signal. Thus, different degradation levels may also be represented, for example, if only some of the power is available. Accordingly, the difference can be used to estimate the potential and/or check the power of the EPS motor by virtue of an increasing difference indicating an increasing degradation level, for example.

Furthermore, the non-linear frictional forces of the steering system may be determined, wherein the limit value is determined taking into account the non-linear frictional forces.

The road forces may be estimated, with the result that the limit value can be determined taking the road forces into account.

The road forces may be determined for example using modeling based on a virtual spring.

The spring stiffness of the virtual spring can be determined or calculated via the vehicle speed and a motor torque. For example, the spring stiffness can be described using a mathematical term that is composed of a purely speed-dependent first part, e.g. from the vehicle speed, and a speed-dependent and torque-dependent second part, e.g. from the vehicle speed and the maximum available motor torque or EPS torque.

In this case, the spring stiffness may be determined using an estimation method, for example a least squares method, such as using a recursive least squares (RLS) method. Alternatively, however, other estimations or estimation methods may also be used. For example, it is possible to provide an initial estimation which can also be carried out offline, for example, and does not require a recursive method such as the RLS. Although such a method is independent of the method sequence, it can depend heavily on other parameters, for example the tires used.

Furthermore, at least one sensor for capturing the surroundings may be provided, for example a camera and/or a lidar sensor and/or a radar sensor and/or an ultrasonic sensor. The vehicle environment and objects and road users located therein can be captured using the sensor data from the sensor or sensors. The sensor data from a plurality of sensors may also be as part of the capture of the environment and objects.

The captured vehicle surroundings, including objects and road users located therein, can be used to define the search space of the manipulated variable and/or for trajectory planning. This may be carried out, for example, by additionally limiting the search space for possible trajectories, since objects detected by the sensors are in the previously limited search space. Furthermore, the trajectory to be traveled along may be selected during or after trajectory planning in such a way that collision-avoiding aspects are taken into account, for example, by selecting a trajectory that runs along the course of the road and without colliding with other objects/road users.

A computer program with program code for carrying out the method when the computer program is executed in a computer or in another programmable computer known from the prior art is also provided for. Accordingly, the method may also be in the form of a computer-implemented method in the sense of describing scheduling or a procedure that is implemented or carried out using a computer. The computer, for example a computer network or another programmable device known from the prior art (for example a computer device comprising a processor, a microcontroller or the like), can process data in this case using programmable calculation rules.

In addition, a computer-readable storage medium may be provided comprising instructions which cause the computer on which they are executed to carry out a method.

A control device for controlling a vehicle along a trajectory, which control device is set up in such a way that the vehicle is controlled using the method is also provided.

The term search space of the vehicle trajectory or for trajectory planning may be understood as meaning the spatial and temporal extent within which the control unit searches for possible navigable trajectories, wherein it is possible to plan a plurality of trajectories within the search space in order to then select the respective trajectory appropriate to the situation. The term search space of the manipulated variable may be understood as meaning the spatial and temporal extent within which the control unit searches for possible manipulated variables. The search space of the manipulated variable in this case constitutes a subspace of the search space of the vehicle trajectory.

The term limit value may be understood as meaning a maximum value or minimum value of the manipulated variable, i.e. a maximum or minimum whose progression e.g. along the distance traveled or time t can be captured.

The invention may also include combinations of features of the features or claims that are not explicitly mentioned, so-called sub-combinations.

BRIEF DESCRIPTION OF THE DRAWINGS

The present disclosure will become more fully understood from the detailed description and the accompanying drawings, wherein.

DETAILED DESCRIPTION

Figure 1:
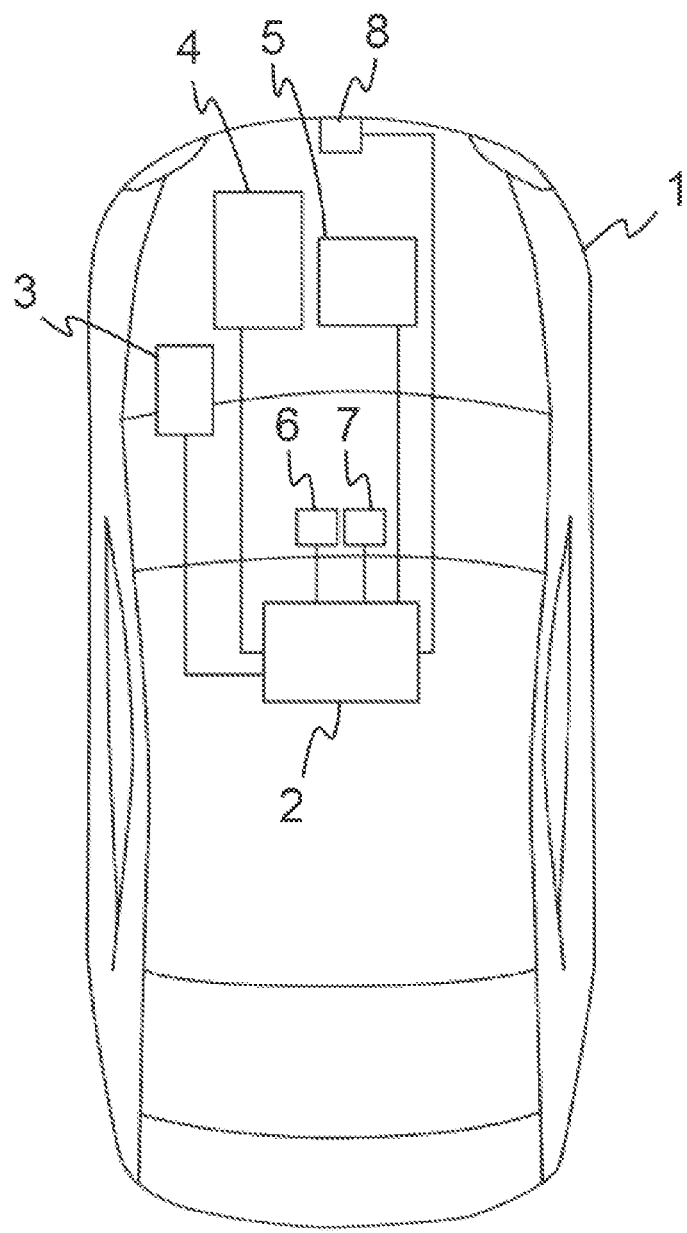
FIG. 1 shows a simplified schematic illustration of a vehicle in which a maximum manipulated variable is predicted.

Reference number 1 in FIG. 1 denotes a vehicle with various actuators (steering system 3, motor 4, brake 5), which vehicle has a control device 2 (ECU, Electronic Control Unit) which can be used to carry out trajectory planning with regard to the actuator dynamic or actuator dynamics. The trajectory may be calculated in this case using a trajectory planner, wherein a maximum manipulated variable of the respective actuator is predicted, for example in the transverse direction with respect to the search space limitation of the trajectory planner, and may be used for trajectory planning. In this case, the trajectory planner may be in the form of a hardware module of the control device 2 or a pure software module. The vehicle 1 also has sensors for capturing the surroundings (camera 6, lidar sensor 7 and radar sensor 8), the sensor data may be used to recognize the surroundings and objects, with the result that various assistance functions, for example emergency brake assistant (EBA, Electronic Brake Assist), adaptive cruise control (ACC, Automatic Cruise Control), lane keeping control or a lane keeping assistant (LKA, Lane Keep Assist) or the like, can be implemented. In a practical manner, the assistance functions can also be carried out via the control device 2 or a dedicated control device.

The method can generally be applied to all actuators found in generic vehicles, and thus also to all steering types used in generic means of transport. Accordingly, it can also be applied to vehicles with excess actuators, i.e. also with front and rear axle steering. The method is described by way of example below with reference to a vehicle with front axle steering, wherein the steering angle $\delta$ is used as the manipulated variable, i.e. the current steering angle $\delta$ can first be measured as a starting value. It can be assumed here that the trajectory planner approach used can process a maximum steering angle $\delta\_max$. Alternatively or additionally, however, other manipulated variables, for example steering angle speed or curvature, would also be possible. The balance of forces in the steering system can be described mathematically as follows"

$$m\_EPS \cdot a = F\_Mot - d \cdot v - F\_Friction - F\_Load \quad (1)$$

In this case, m_EPS is the accumulated mass of the steering system, a is the acceleration of the rack, F_Mot is the force provided by the EPS motor, d is the damping of the EPS, v is the speed of the rack, F_Friction is the non-linear friction of the EPS and F_Load is the load applied to the EPS, consisting of the road forces F_Str and the forces coming from the steering wheel. Such road forces are exerted on the vehicle wheels, for example when driving on a road. To dissipate the energy transfer of these road forces, spring or damper assemblies are generally used in the vehicle suspension system.

Figure 2:
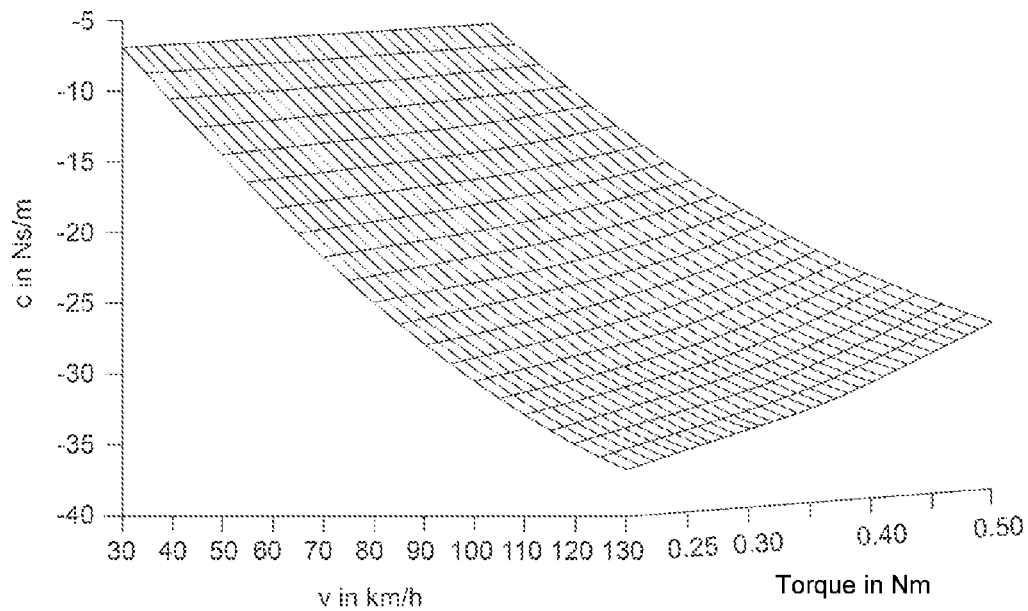
FIG. 2 shows a simplified schematic illustration of a relationship between a virtual stiffness and the vehicle speed and maximum EPS torque.

A maximum manipulated variable may be determined on the basis of the available actuator power without any interference. Interference variables such as the driver's manual torque, which is included in the forces from the steering wheel, can be ignored in this case. Externally acting interference variables, for example side wind, are ignored, since such interference can be compensated for by the control, for example. The remaining road forces F_Str, on the other hand, and thus also F_Load, cannot be easily ignored, since they have a significant influence on the maximum steering angle and are therefore not regarded as interference, since they always occur. Looking at the road forces F_Str at vehicle level in a single-track model shows that they depend on the current steering angle, the vehicle speed and the road coefficient of friction. However, the influence of the road coefficient of friction can be ignored here, with the result that only scenarios with a high coefficient of friction are considered. This is possible because, although a reduced coefficient of friction leads to a higher maximum steering angle, this does not necessarily lead to a higher navigable curvature and therefore not to a navigable trajectory either. Accordingly, the dependence of the road forces F_Str on the steering angle and the vehicle speed remains. Due to the steering angle dependence for modeling the road forces F_Str, a virtual spring with the vehicle-speed-dependent spring stiffness c is used. The spring stiffness c is also dependent on the maximum set EPS torque M_Mot_max, as illustrated in FIG. 2. This results from non-linearities, such as the translation between rack travel and steering angle at the wheel or the steering-angle-dependent follow-on running.

The following thus results from equation (1):

$$m\_EPS \cdot a = F\_Mot - d \cdot v - F\_Friction - c(v\_veh, M\_Mot\_max) \cdot x \quad (2)$$

In this case, v_veh is the vehicle speed and x is the rack position which can be converted into a steering angle $\delta$ using a transmission ratio i. The term c (v_veh, M_Mot_max) is composed in this case of a purely speed-dependent part c1 (v-veh) and a speed-dependent and torque-dependent part c2 (v_veh, M_Mot_max):

$$c(v\_veh, M\_Mot\_max) = c1(v\_veh) c2(v\_veh, M\_Mot\_max). \quad (3)$$

This can be used to derive a lookup table for the spring stiffness c (according to FIG. 2) which may be derived, for example, from step excitations on the steering system at different speeds. For example, the spring stiffness c can be estimated and adapted on the basis of speed using an RLS (recursive least squares) algorithm. In this case, only c1 (v_veh) has to be adapted, since the term c2 (v_veh, M_Mot_max) reflects structural, unchanging relationships. As a result, a maximum settable steering angle $\delta$ to the left and to the right should be predicted in this case, in which case the maximum force that can still be set by the EPS motor is selected for F_Mot and applied as a step, which is filtered with a motor time constant T_Mot, according to $$F\_Mot = 1/(T\_Mot \cdot s + 1) \cdot F\_Mot\_max. \quad (4)$$

In this case, F_Mot_max is the difference between the currently applied force and the maximum available force. The maximum available force can be determined using the power of the EPS or is made available to the prediction by the EPS as an input signal. This makes it possible, for example, to represent different degradation levels of the EPS motor if only some of the power is available. The non-linear friction F_Friction corresponds to the static friction in the system and can also be taken into account via a so-called dead zone in the motor force F_Mot, since only one constant direction of movement is ever considered and the hysteresis effects of static friction are therefore not relevant. The result is therefore:

$$F\_Mot\_Fric = 0 \text{ if } |F\_Mot| < F\_Haft$$

$$F\_Mot - F\_Haft \text{ if } F\_Mot > F\_Haft$$

$$F\_Mot + F\_Haft \text{ if } -F\_Mot < F\_Haft. \quad (5)$$

Here, F_Haft is the amplitude of the adhesive force. Furthermore, equation (2) results in equation (6), $$m\_EPS \cdot a = F\_Mot\_Fric - d \cdot v - c(v\_veh, M\_Mot\_max) \cdot x, \quad (6)$$

which corresponds to a second-order delay element. The damping d can be chosen to be constant in this case.

Figure 3:
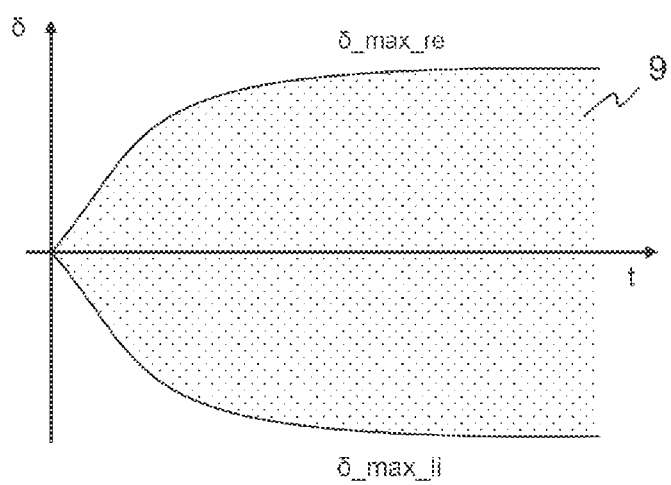
FIG. 3 shows a simplified illustration of a search space of the steering angle that is limited using the method.

A maximum rack position or a maximum steering angle δ_max can thus be predicted by switching according to the acceleration in equation (6) and double integration. The resulting vectors for the maximum steering angle to the right (δ_max_re) and to the left (δ_max_li) over time t can then be sampled in order to reduce the amount of data to be sent and forwarded to the planner as a feedback signal. The two vectors indicate the upper and lower limits of the search space of the manipulated variable in which the trajectory planner can search for an optimal solution, as shown in FIG. 3 using the limited search space 9 illustrated using dotted lines between the two vectors δ_max_re, δ_max_li.

Figure 4:
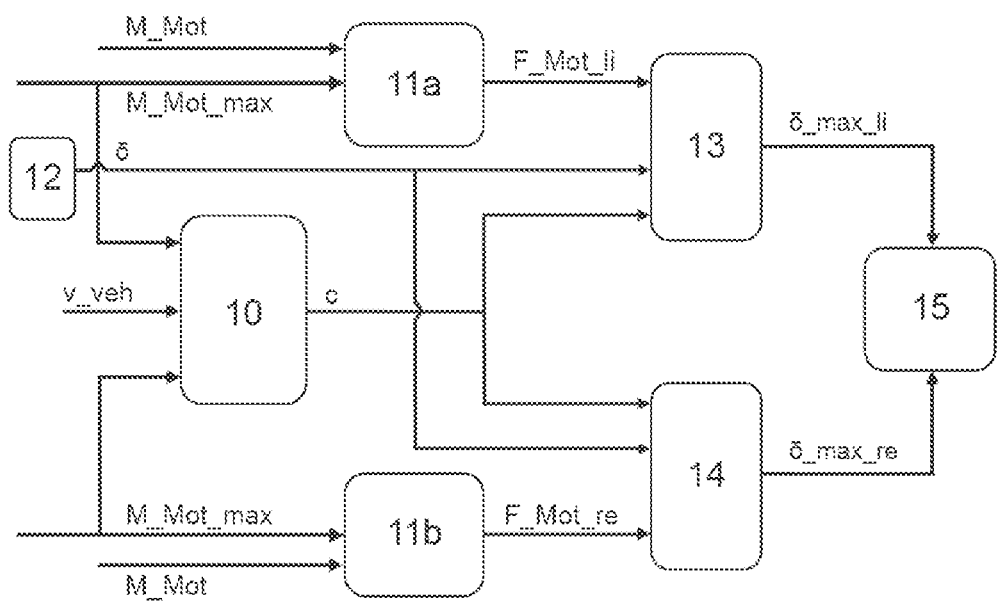
FIG. 4 shows a simplified schematic illustration of a flowchart of the method.

In the exemplary embodiment of a method sequence according to FIG. 4, a predicted maximum time progression of the steering angle to the left and to the right is output for a vehicle with front axle steering. In this case, the steering angle δ is first determined or measured as the starting value (steering angle determination 12) and the spring stiffness c is determined, for example, using the described look-up table (cf. FIG. 2) (determination of the spring stiffness 10). In addition, the engine property and characteristics 11a (on the left) and 11b (on the right) are determined, inter alia, based on the currently applied motor torque (motor torque detection), i.e. the currently applied motor torque M_Mot. The engine property and characteristics can be different to the left and to the right, for example due to asymmetries in the steering or artificially introduced asymmetries, e.g. in the course of an LDP (Lane Departure Protection) function, in which the steering is more limited in the direction of the closer lane boundary. The progression of the maximum manipulated variable can then be predicted on the basis of the spring stiffness and engine property and characteristics, in this case the maximum steering angle to the left (prediction on the left 13) and the maximum steering angle to the right (prediction on the right 14). The predicted steering angles are then forwarded to planner 15. If the vehicle also has rear axle steering, it is possible to determine the rear axle steering angle in the same way as the front axle steering angle, i.e. there are two further vectors on the rear axle for the rear axle steering, one for the maximum steering angle to the left and one for the maximum steering angle to the right. Accordingly, the method sequence in FIG. 4 describes, on the one hand, the method sequence for determining the maximum steering angles for the front axle or the rear axle. Alternatively or additionally, the curvature to be navigated can be used as a manipulated variable, regardless of whether or not there is rear axle steering. The advantage of this configuration is that only two vectors arise (maximum curvature to the left and to the right) even when there is rear axle steering. However, a vehicle model should then again be provided for determination.

In a practical way, the predicted manipulated variable limit can also be used for anti-wind-up concepts in the controller. Furthermore, the lookup table for the stiffness and the relationship according to FIG. 2 can also be used estimate a load of the vehicle.

The invention claimed is:

1. A method for controlling a vehicle along a trajectory comprising:

accessing a plurality of actuators of the vehicle to control the vehicle with a control device, the plurality of actuators including an electronic power steering ("EPS") motor of a steering system;

determining at least one limit value for at least one manipulated variable of one of the plurality of actuators, wherein the at least one manipulated variable includes a motor torque of the EPS motor;

defining a search space of the variable on the basis of the at least one limit value, wherein the at least one limit value includes an estimated potential of the EPS motor;

estimating the potential of the EPS motor by determining a difference between a force currently applied to the EPS motor and a maximum available force; and planning the trajectory of the vehicle within the search space with the control device.

2. The method as claimed in claim 1, wherein the at least one manipulated variable may further include at least one of a steering angle, a steering angle speed, and curvature of the road.

3. The method as claimed in claim 2, further comprising providing a maximum time progression of the manipulated variable to a left of the vehicle and a maximum time progression of the manipulated variable to a right of the vehicle as the limit value and are synchronized with a planner.

4. The method as claimed in claim 1, further comprising determining non-linear frictional forces of the vehicle, and wherein determining the limit value is at least partially based on the non-linear frictional forces.

5. The method as claimed in claim 1, further comprising determining road forces on the vehicle, and wherein determining the limit value is at least partially based on the road forces.

6. The method as claimed in claim 5, wherein the determining the road forces further comprises using modeling based on a virtual spring.

7. The method as claimed in claim 6, wherein the determining the spring stiffness of the virtual spring further comprises using the vehicle speed and a motor torque.

8. The method as claimed in claim 7, wherein the determining the spring stiffness of the virtual spring further comprises using a least squares method.

9. The method as claimed in claim 8, wherein the determining the spring stiffness of the virtual spring further comprises using a recursive least squares method.

10. The method as claimed in claim 1, further comprising capturing the surroundings with at least one sensor.

11. The method as claimed in claim 10, wherein the capturing the surroundings with at least one sensor further comprises using at least one of a camera, a lidar sensor, a radar sensor, and an ultrasonic sensor.

12. The method as claimed in claim 10, wherein at least one of defining the search space and planning the for trajectory further comprises the using the captured surroundings.

13. The method as claimed in claim 1, wherein a computer program with program code for carrying out the method is executed on a computer.

14. The method as claimed in claim 1, wherein a computer-readable storage medium comprises instructions which cause the computer on which they are executed to carry out a method.

15. A control device for controlling a vehicle along a trajectory, the control device configured to:

access a plurality of actuators of the vehicle to control the vehicle with a control device, the plurality of actuators including an electronic power steering ("EPS") motor of a steering system;

determine at least one limit value for at least one manipulated variable of one of the plurality of actuators, wherein the at least one manipulated variable includes a motor torque of the EPS motor;

define a search space of the variable on the basis of the at least one limit value, wherein the at least one limit value includes an estimated potential of the EPS motor;

estimate the potential of the EPS motor by determining a difference between a force currently applied to the EPS motor and a maximum available force; and plan the trajectory of the vehicle within the search space with the control device.

16. The control device as claimed in claim 15, wherein the at least one manipulated value may further include at least one of a steering angle, a steering angle speed, and a curvature of the road.

17. The method as claimed in claim 15, wherein the limit value is at least partially based on the road forces.

18. A method for controlling a vehicle along a trajectory comprising:

accessing a plurality of actuators of the vehicle to control the vehicle with a control device;

determining at least one limit value for at least one manipulated variable of one of the plurality of actuators;

defining a search space of the variable on the basis of the at least one limit value;

planning the trajectory of the vehicle within the search space with the control device;

determining road forces on the vehicle, and wherein determining the limit value is at least partially based on the road forces;

wherein determining the road forces further comprises using modeling based on a virtual spring;

wherein the determining the spring stiffness of the virtual spring further comprises using the vehicle speed and a motor torque; and wherein the determining the spring stiffness of the virtual spring further comprises using a least squares method.

* * * * *